Jan. 5, 1960  E. P. BRANE  2,920,177
BROILER APPARATUS
Filed Sept. 16, 1957  2 Sheets-Sheet 1

INVENTOR.
EARL P. BRANE.
BY
Lockwood, Galt, Woodard & Smith
ATTORNEYS.

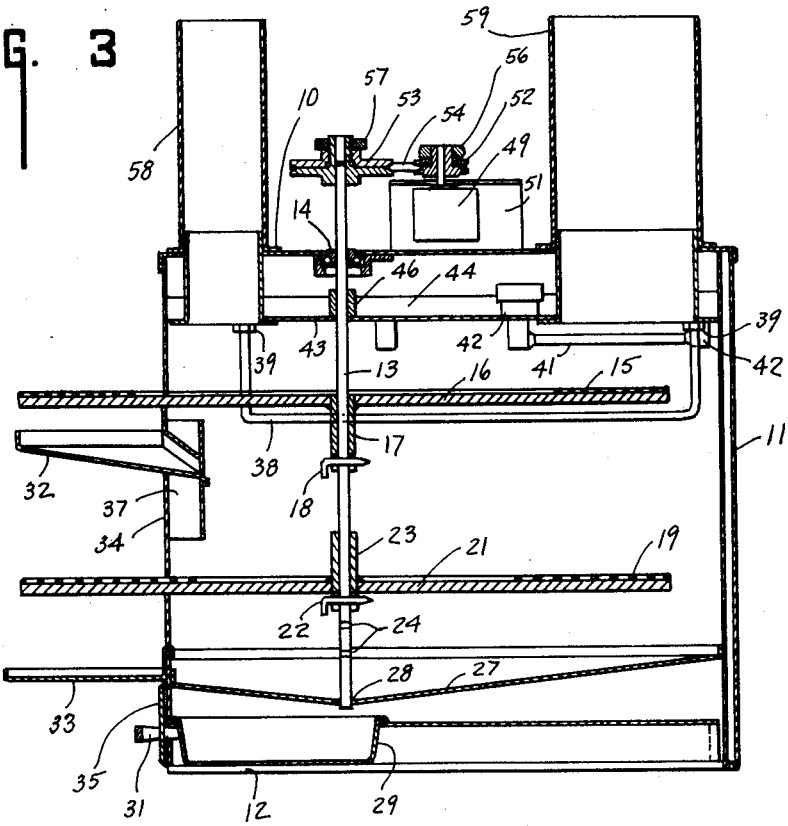

United States Patent Office 2,920,177
Patented Jan. 5, 1960

2,920,177

BROILER APPARATUS

Earl P. Brane, Indianapolis, Ind.

Application September 16, 1957, Serial No. 684,131

1 Claim. (Cl. 219—35)

This invention relates generally to an automatic broiling apparatus, and in particular to an apparatus for preparing toasted sandwiches having broiled meat fillings.

In the interest of serving a large number of customers promptly in soda fountains or other eating establishments, a suitable broiler apparatus must be capable of turning out sandwiches such as toasted hamburger ones rapidly, with the sandwiches having a uniform quality. An apparatus of this type should also be characterized by a simplicity in construction permitting convenient dismantling of the apparatus for periodic cleaning.

The primary object of the present invention is to provide a broiling apparatus in which rotating racks or grills may be rapidly and conveniently loaded, with the meat placed upon one rack and the sandwich buns or bread accommodated on a rack disposed directly below the broiling meat so as to retain the drippings therefrom.

A further object of the present invention is to provide a broiling apparatus which broils and toasts sandwich components rapidly with a minimum of attention required of the operator.

A still further object of this invention is to provide a broiling apparatus in which the meat and sandwich buns are toasted simultaneously, with the meat, such as hamburger patties, being broiled on both sides.

A still further object of the present invention is to provide a broiling apparatus of the type referred to above which may be easily dismantled for cleaning.

It is a still further object of the present invention to provide a broiling apparatus in which the broiling time is adjustable for broiling meats having differing cooking characteristics.

The full nature of the invention will be understood from the accompanying drawings and the following description and claim:

Fig. 3 is a side sectional view of the broiling apparatus.

Figure 1:
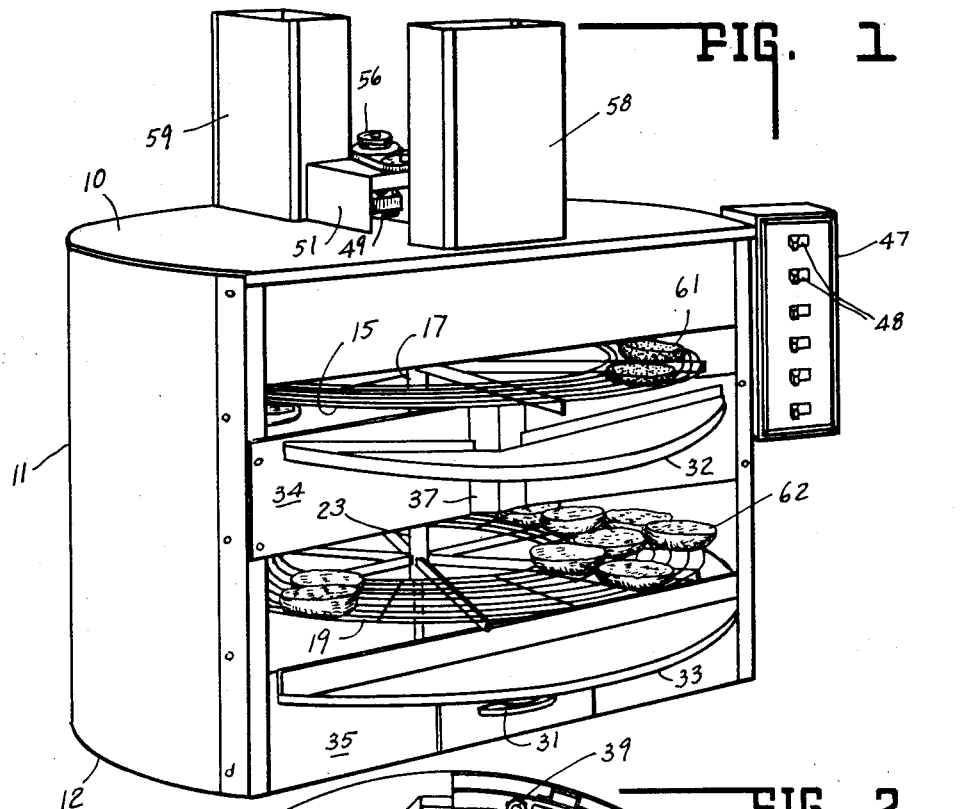
Fig. 1 is a perspective view of an apparatus embodying the present invention.

The broiling apparatus of the present invention comprises a housing having a laterally truncated cylindrical configuration and provided with a cover plate 10, curved side wall 11 and a base plate 12. A shaft 13 is disposed vertically within the housing and journaled for rotation by a suitable bearing 14 carried by the top plate.

Mounted for rotation with the shaft is a broiling rack or grill 15 which is generally annular in configuration and is supported upon a spider assembly 16 including a hub 14 through which the shaft extends. A removable pin 18 extends through aligned openings in the hub and shaft, locking the spider assembly to the shaft for rotation thereby.

A toasting rack 19, similar in configuration to the broiling rack, is mounted in underlying relation to the broiling rack by means of spider assembly 21 which is supported for rotation by the shaft by means of removable pin 22.

This pin extends through aligned openings in the hub 23 and the shaft, with alternately usable openings 24 permitting adjustment of the position of the toasting rack along the shaft.

A drip shield 27 extends across the housing beneath the toasting rack and is concavely formed so as to drain toward the opening 28 therein through which the shaft freely extends. A grease pan 29 is slidably mounted beneath the drip shield and is removable from the front of the housing by means of a handle 31.

Drip pans 32 and 33, mounted on front plates 34 and 35, respectively, are disposed beneath the portions of the broiling rack and toasting rack which extend beyond the housing. The drip pan 32 is inclined rearwardly and downwardly so as to drain toward an opening formed by a rearwardly extending portion 37 of the plate 34, the drippings directed therethrough being caught on the pan 33.

Figure 2:
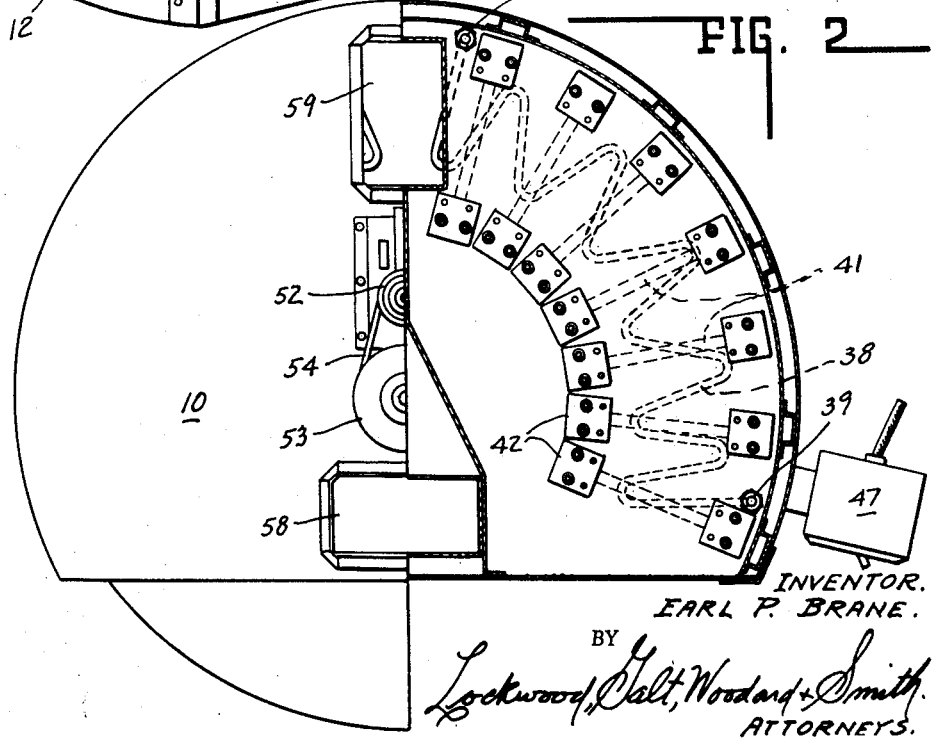
Fig. 2 is a top view of the apparatus with portions broken away to indicate the disposition of the heating elements.

The heating means used in the broiling operation includes an electric heating element 38 extending from suitable terminal mounting members 39 to a position just beneath the broiling rack. This element may be of the shielded type and, as may best be seen in Fig. 2, is sinuous in configuration and extends across half of the housing with a similar heating element (not shown) extending across the other half of the housing. The heating elements just referred to serve to sear the lower surface of meat carried by the broiling rack and also serve to toast buns or bread carried on the toasting rack.

The broiling heaters include a series of infrared heating elements 41 radially disposed within the housing in overlying relation to the broiling grill. The elements 41 are of conventional quartz type and are supported by means of terminal blocks 42. Both the terminal blocks and the terminal support members are carried by a heat reflecting plate 43 which extends across the top of the housing and is topped by thermal insulation 44. A suitable sleeve 46 accommodates the shaft at its point of extension through the insulating material and the plate 43.

A control box or switch housing 47 serves to provide access to switches 48 which are integrated into a control circuit (not shown and forming no part of the present invention) which controls energization of the heating elements and of a drive motor 49 which is mounted on the top plate by means of bracket 51.

The drive shaft of the motor is suitably keyed to a pulley 52 whose rotary motion is transferred to a pulley 53 by means of a V-belt 54, pulley 53 being keyed to shaft 13. Both of the pulleys are of a conventional adjustable type, the knurled knobs 56 and 57 serving to position relative to each other the opposed halves of the pulleys 52 and 53 respectively, to thereby determine the speed of rotation of the shaft 13, and consequently the rate of movement of the racks within the housing.

Front and rear smoke stacks 58 and 59 communicate with the interior of the housing and extend from the top plate. These stacks may be suitably connected to discharge ducts for carrying away any smoke or fumes produced within the broiler housing.

In operation, assuming that the broiler is to be used in preparing toasted hamburger sandwiches, the meat patties 61 (Fig. 1) may be placed upon the portion of the broiling rack extending outside the housing and buns 62 may be loaded on the toasting rack, preferably in underlying relation to the meat patties so that any drippings therefrom will accumulate on the buns.

The heating elements and the drive motor may then be energized by means of the control switches to cause the racks to be rotated counterclockwise within the housing with the meat patties and buns traveling past the heating elements to emerge broiled and toasted from the housing on the side opposite their area of entry therein.

The broiled meat patties and toasted buns may be removed from the racks and replaced by additional unprocessed patties and buns as the racks move exteriorly of the housing. The degree of toasting and broiling may be suitably varied by adjusting the speed of rotation of shaft 13 by means of knobs 56 and 57, and this adjustment may also be used to broil to the desired degree meats other than hamburger patties having differing broiling time requirements. As previously mentioned, by means of alternate openings 24 in the shaft 13, the toasting rack may be adjustably positioned to provide an additionally adjustable factor in the toasting operation.

The broiler apparatus may be conveniently dismantled for cleaning by removing the pins 18 and 22 and the V-belt, permitting the shaft 13 to be withdrawn from the housing. Both racks and their accompanying spider assemblies may then be removed from the housing for cleaning, leaving the interior of the housing also clear for cleaning.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

An apparatus for preparation of toasted sandwiches having broiled meat fillings comprising a housing having a laterally truncated cylindrical configuration and adapted to rest on one of its ends, a shaft mounted vertically for rotation within the housing, a meat accommodating broiling rack and a bun or bread accommodating toasting rack mounted in spaced relation on said shaft and adapted to be rotated in a horizontal plane with a portion of the racks extending exteriorly of the housing, drip pans mounted on the front face of said housing and extending in underlying relation to the exposed portions of said racks, said broiling rack overlying said toasting rack to permit drippings to accumulate on the contents of the toasting rack, a source of infrared heat disposed within said housing in overlying relation to said broiling rack, a second source of heat disposed within said housing between said racks, and adjustable speed driving means mounted on the outer face of the upper end of said housing for driving said shaft thereby rotating said racks into and out of proximity with said heat sources.

References Cited in the file of this patent

UNITED STATES PATENTS

| | | |
|---|---|---|
| 1,054,321 | Sinks | Feb. 25, 1913 |
| 1,543,212 | Kurrell et al. | June 23, 1925 |
| 1,543,692 | Biebel | June 30, 1925 |
| 2,127,658 | Walterspiel | Aug. 23, 1938 |
| 2,168,773 | Parr | Aug. 8, 1939 |
| 2,419,261 | Groetchen | Apr. 22, 1947 |
| 2,438,699 | Groetchen | Mar. 30, 1948 |
| 2,646,495 | Dornbush | July 21, 1953 |